No. 701,346. Patented June 3, 1902.
G. F. JERNIGAN.
AMALGAMATING APPARATUS.
(Application filed June 7, 1900.)
(No Model.)

Witnesses:
Jas. F. Coleman
Jno. R. Taylor

Inventor
George F. Jernigan
by
Ayer Edmonds & Ayer
Att'ys.

UNITED STATES PATENT OFFICE.

GEORGE F. JERNIGAN, OF NEW YORK, N. Y., ASSIGNOR OF ONE-HALF TO NELSON T. SHIELDS, OF NEW YORK, N. Y.

AMALGAMATING APPARATUS.

SPECIFICATION forming part of Letters Patent No. 701,346, dated June 3, 1902.

Application filed June 7, 1900. Serial No. 19,375. (No model.)

*To all whom it may concern:*

Be it known that I, GEORGE F. JERNIGAN, a citizen of the United States, residing in the borough of Manhattan, in the city, county, and State of New York, have invented a certain new and useful Improvement in Amalgamating Apparatus, of which the following is a specification.

My invention relates to improvements in amalgamating apparatus of the type wherein a muller carrying grinding-plates coöperates with a grooved circular bottom; and the object of my invention is to provide an improved amalgamating apparatus of very much greater capacity than any device of the kind heretofore suggested and with which I am acquainted.

In carrying my invention into effect I employ a tank or receptacle of the desired size, and I divide the same into a series of sections connected together and each provided with amalgamating devices of any desired type. The division of the receptacle or tank into a series of sections is effected by the utilization of partitions of novel form, by reason of which the sections will be intercommunicating, and each will be provided with sloping walls, whereby the material in course of amalgamation will tend at all times to gravitate toward the mulling devices.

In order that my invention may be better understood, attention is directed to the accompanying drawings, forming part of this specification, and in which—

Figure 1:
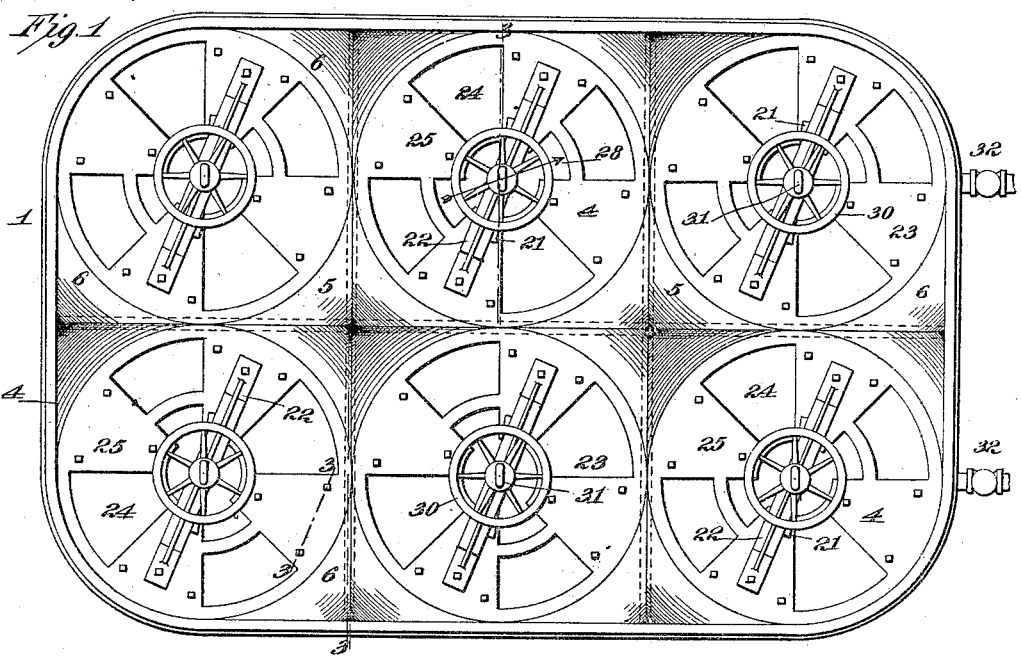
Figure 2:
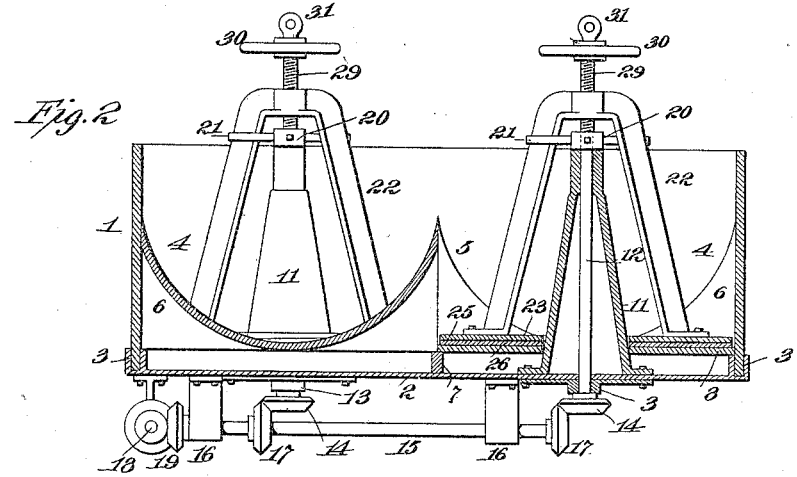
Figure 3:
Figure 4:
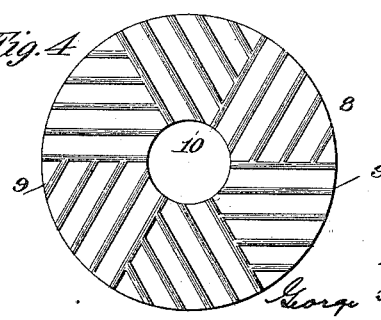

Figure 1 is a plan view of my improved amalgamating apparatus, showing the tank or receptacle as being provided with six sections; Fig. 2, a section on the line 2 2 of Fig. 1; Fig. 3, a section on the line 3 3 of Fig. 1, showing the preferred construction of grinding-plate for the muller; and Fig. 4, a plan view of the preferred construction of grooved bottom for each pan-section.

In all of the above views corresponding parts are represented by the same numerals of reference.

1 represents a large receptable or tank of the desired capacity, made, preferably, with wooden sides and with a metal bottom 2, the latter being grooved at 3, as shown, for the reception of the sides of the tank. The space inclosed by the tank or receptacle 1 is divided into a series of sections 4 4, six of such sections being shown and each constituting practically a separate amalgamating-pan. The sections 4 are formed by the partitions 5 5, centrally located in the tank, and the partitions 6 6, half the size of the partitions 5 and located at the sides of the tank. The partitions 5, as shown, are of the form of pyramids, having four concave sides, while the partitions 6 are of the form of half-pyramids with two concave sides. The partitions 5 and 6 are suitably carried from the bottom 2 by means of supporting-beams 7, as shown. Carried upon corresponding beams are the section or pan bottoms 8, made, preferably, of iron and being provided with grooves 9 9 in the usual way for the reception of the mercury. Extending up from the bottom 2 of the device through openings 10 in the section-bottoms are the bearing-sleeves 11, and mounted in each of said sleeves is a muller-shaft 12, having a lower bearing 13, secured to the bottom 2. All the muller-shafts of the apparatus are driven in any suitable way, but preferably by gearing, as shown, each shaft being provided with a bevel-gear 14 and each pair of muller-shafts being driven from an auxiliary shaft 15, carried in bearings 16 and provided with bevel-gears 17, engaging the gears 14. The several auxiliary shafts 15 of the device are driven from a main shaft 18 by bevel-gears 19, as shown. At the upper end of each muller-shaft is a collar 20, formed with arms 21, which engage the U-shaped supports 22 for the mullers 23. Each muller, as shown particularly in Fig. 2, is formed with cut-away portions 24 and with solid sections 25, each of the latter sections carrying a shoe or plate 26, bolted in position, and each being provided with a curved or inclined forward edge 27, as shown in Fig. 3, to cause the material to more readily pass beneath the same to facilitate the operation.

By reason of the construction indicated a free space is offered, as shown by the arrow 28, to permit the removal of any one of the mullers over the arms 21 when it is desired to remove the mullers for repair thereof or for replacing a new section-bottom in position. The adjustment of the mullers can be effected in any suitable and ordinary way—as, for instance, by means of an adjusting-screw 29 passing through the upper part of the U-shaped support 22 and bearing upon the top of the muller-shaft 12, said screw being provided with a hand-wheel 30 for rotating it and with an eye 31, to which a tackle may be connected for the purpose of removing the muller when desired.

In operation it will be observed that the material to be acted upon by the several mullers will be caused, by reason of the sloping walls of the several sections, to progress by gravity always toward the bottom, so as to be effectively acted upon by the mullers, while by employing connecting-sections, as shown, a circulation of the material successively through the several sections can take place, if desired.

For the purpose of drawing off the material after the amalgamating has progressed sufficiently I illustrate a pair of draw-off pipes 32 32.

By carrying the several partitions 5 and 6 and the section-bottoms 8 on supports 7, as explained, a space is afforded between such elements and the bottom 2 of the tank for the introduction of steam-pipes when it is desired to artificially heat the material in process of amalgamation, as is common. If, however, artificial heating is not desired, it will be understood that the partitions and the said section-bottoms can be carried directly upon the bottom 2 of the tank or receptacle 1.

Having now described my invention, what I claim as new, and desire to secure by Letters Patent, is as follows:

1. In an amalgamating apparatus, the combination of a rectangular tank, a series of pyramidal projections or partitions 5 mounted upon the bottom of said tank, a series of semipyramidal partitions 6 mounted at the sides of the tank whereby a series of connected mulling-chambers will be formed each having sloping walls, and a series of mullers rotatably mounted in each of said chambers whereby the rotation thereof will cause the material to progress successively through the several chambers and around the tank, substantially as and for the purposes set forth.

2. In an amalgamating apparatus, the combination of a rectangular tank, a series of pyramidal projections or partitions 5 mounted upon the bottom of said tank, a series of semipyramidal partitions 6 mounted at the sides of the tank whereby a series of connected mulling-chambers will be formed each having sloping walls, a series of mullers rotatably mounted in each of said chambers whereby the rotation thereof will cause the material to progress successively through the several chambers and around the tank, and means for simultaneously rotating all of said mullers, substantially as and for the purposes set forth.

3. In an amalgamating apparatus, the combination of a rectangular tank, a series of pyramidal projections or partitions 5 mounted upon the bottom of said tank, a series of semipyramidal partitions 6 mounted at the sides of the tank whereby a series of connected mulling-chambers will be formed each having sloping walls, a series of mullers rotatably mounted in each of said chambers whereby the rotation thereof will cause the material to progress successively through the several chambers and around the tank, and a removable grooved bottom for each of said mulling-chambers and with which said mullers coöperate, substantially as and for the purposes set forth.

This specification signed and witnessed this 25th day of May, 1900.

GEORGE F. JERNIGAN.

Witnesses:
  FRANK L. DYER,
  JNO. R. TAYLOR.